United States Patent [19]
Gitlin et al.

[11] Patent Number: 5,625,884
[45] Date of Patent: Apr. 29, 1997

[54] GLOBAL PAGING WITH REVERSE VIRTUAL CALL SETUP IN WIRELESS PERSONAL COMMUNICATIONS

[75] Inventors: Richard D. Gitlin, Little Silver; Chih-Lin I, Manalapan, both of N.J.

[73] Assignee: Lucent Technologies Inc., Murray Hill, N.J.

[21] Appl. No.: 255,684

[22] Filed: Jun. 8, 1994

[51] Int. Cl.$^6$ .................................................. H04B 7/00
[52] U.S. Cl. .................. 455/54.1; 455/33.1; 455/34.2; 455/89; 379/59; 379/63
[58] Field of Search .................. 455/33.1, 34.1, 455/34.2, 54.1, 54.2, 56.1, 67.1, 68, 89, 33.2; 379/59, 58, 56, 65, 63

[56] References Cited

U.S. PATENT DOCUMENTS

| | | | |
|---|---|---|---|
| 4,575,582 | 3/1986 | Makino | 455/54.2 |
| 4,771,448 | 9/1988 | Koohgoli et al. | 455/34.2 |
| 5,305,466 | 4/1994 | Taketsugu | 455/33.1 |
| 5,345,597 | 9/1994 | Strawczynski et al. | 455/54.2 |
| 5,363,426 | 11/1994 | Nyhart | 455/34.2 |

FOREIGN PATENT DOCUMENTS 0224422  9/1988  Japan ...................... 455/343

*Primary Examiner*—Reinhard J. Eisenzopf
*Assistant Examiner*—Doris To

[57] ABSTRACT

A method and apparatus providing communications between mobile units and other communications devices, is disclosed wherein, in response to a request to call a mobile unit from an originating communications device, a paging signal is sent via a global communications network and received by a mobile unit. The paging signal contains caller and callee identification codes, which are decoded by the mobile unit. A paging response signal, in the form of a reverse call setup signal, is then transmitted from the mobile unit to the originating communications device. Transmission of the paging signal is preferably stopped when a correspondence condition exists such that the caller and callee identification codes of the paging signal correspond to the caller and caller identification codes of the paging response signal.

18 Claims, 6 Drawing Sheets

GLOBAL PAGING WITH REVERSE VIRTUAL CALL SETUP IN WIRELESS PERSONAL COMMUNICATIONS

FIELD OF THE INVENTION

This invention relates to wireless mobile communications, and more particularly, to techniques for setting up calls in personal communications networks between mobile units, such as mobile telephones, and communications devices.

BACKGROUND OF THE INVENTION

Various techniques are known in the art for allowing a mobile unit, such as a mobile telephone, to communicate with a communications device, such as a hardwired telephone or another mobile unit. First generation personal communications networks required that a caller communications device know the current location of a callee mobile unit in order to successfully setup a call. Proposals for second generation personal communications networks require a mobile unit to perform two operations upon its entry into a new geographical area. First, the mobile unit must register at a visitor location register (VLR) and second, the mobile unit must update the contents of its home location register (HLR) to reflect its new location. As a travelling mobile unit moves into and out of different geographic areas, the required registering and updating operations would cause a tremendous increase in signalling traffic and would also be inconvenient.

In order to setup a call to a mobile unit using the proposed VLR/HLR technique, the network would first look at the mobile unit's HLR to find its current location. Then the network would send signalling information to that location and wait for a paging response from the mobile unit. When the network receives the paging response, it would setup a call from the originating caller to an access point of the callee mobile unit. Such a call setup technique would incur significant delays.

SUMMARY OF THE INVENTION

The present invention provides global paging with reverse virtual call setup. There is no need to keep track of a mobile unit's location. A call to a mobile unit causes signalling by a paging subnetwork via satellite or a terrestrial system. The paging is preferably conducted over a large geographic area, such as the mainland of the United States of America. A paging signal is preferably sent which contains an identifying code for both the caller and the callee. Upon receiving the paging signal, the called mobile unit starts a reverse call setup procedure automatically or in response to an input from a mobile unit operator. Although the call is setup physically from the callee mobile unit, the call is preferably treated as being initiated by the originating caller. The present invention greatly alleviates signalling traffic in personal communications networks and reduces call setup delay.

In one embodiment of the present invention., a processor is provided at a paging device, which is preferably a paging subnetwork. The processor forms a paging signal comprised of a caller identification code and a callee identification code in response to a request to call a mobile unit from an originating communications device. The paging signal is stored in memory and transmitted.

The processor causes continuous transmission of the paging signal until a time out, or until a reverse call setup signal is received from the mobile unit. If the paged device receives a paging response signal, the paging response signal is examined to determine if it is a reverse call setup signal. If the caller and callee identification codes of the paging signal correspond to the callee and caller identification codes of the paging response signal, respectively, the paging response signal is recognized as a reverse call setup signal by the paging device. In that case, paging is stopped, the paging signal is deleted from memory, and the originating communications device is billed for the call.

In another embodiment of the present invention, a mobile unit is provided which receives a paging signal from a paging device. The paging signal is decoded to determine a callee identification code. If the callee identification code corresponds to the identification code of the mobile unit, the mobile unit forms a reverse call setup signal which is preferably the reverse of the paging signal. The callee and caller identification codes of the paging signal correspond to the caller and callee identification codes, respectively, of the reverse call setup signal. The reverse call setup signal is then transmitted from the mobile unit to the originating communications device.

The above discussed features, as well as additional features and advantages of the present invention, will become more readily apparent by reference to the following detailed description and the accompanying drawings.

DETAILED DESCRIPTION OF THE DRAWINGS

Figure 1:
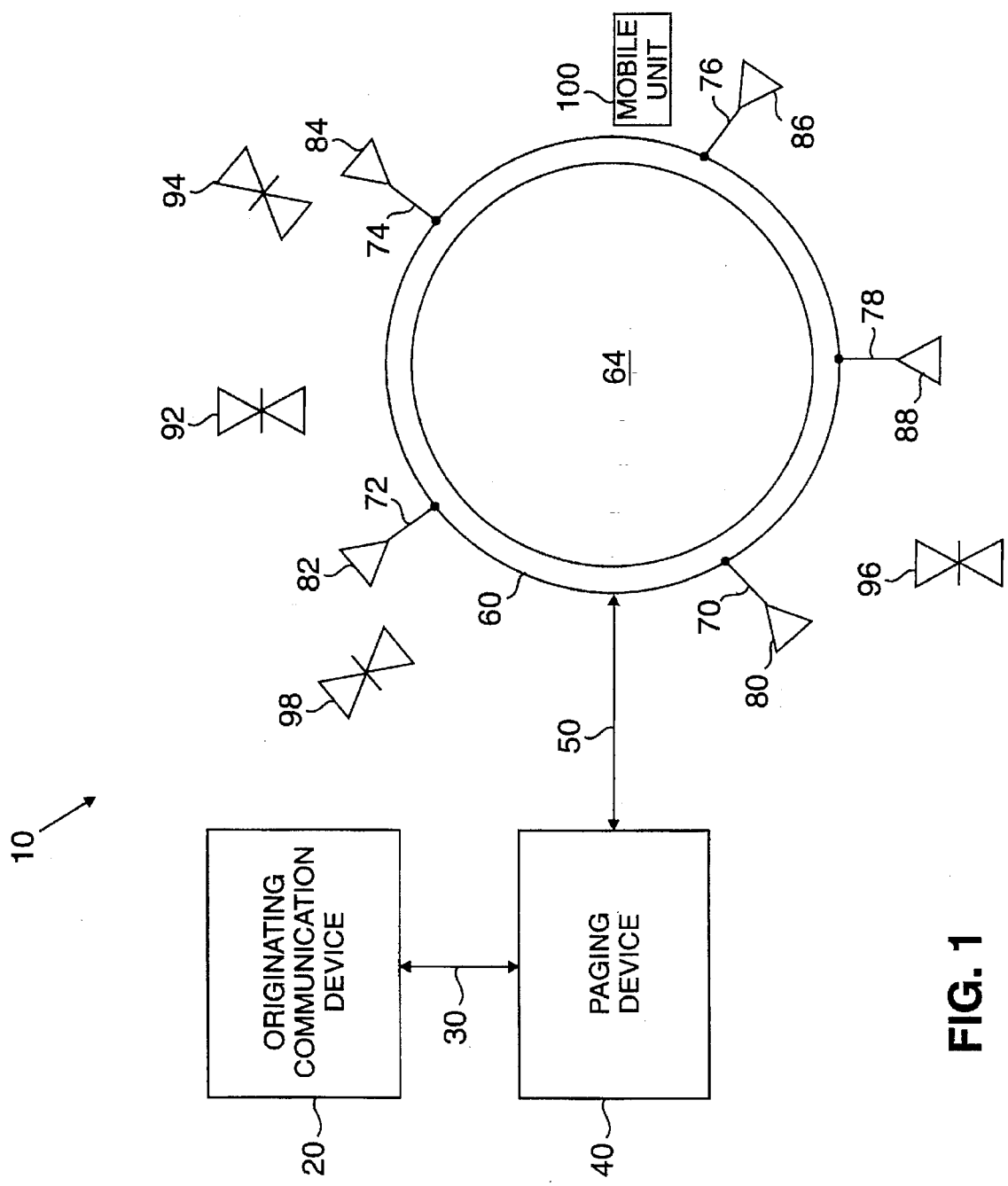
FIG. 1 is a schematic representation of apparatus for implementing the global paging and reverse call setup operation of the present invention.

FIG. 1 is a schematic representation of an apparatus 10 for implementing the global paging and reverse call setup technique of the present invention. The apparatus 10 comprises a paging device 40 which sends a paging signal to a mobile unit 100 and receives a reverse call setup signal from a mobile unit 100 through a global communications network 60. The paging device 40 is preferably a paging subnetwork.

An originating communications device 20 is connected by a communication link 30 to the paging device 40. The paging device 40 is connected by a communication link 50 to a global communications network 60. A plurality of transmitter/receivers 80, 82, 84, 86, and 88, are connected to the communication links 70, 72, 74, 76, and 78, respectively. The communication links 70, 72, 74, 76, and 78 are in turn connected to the global communication network 60. Satellites 92, 94, 96, and 98 surrounding the earth 64 are also shown in FIG. 1.

Figure 2:
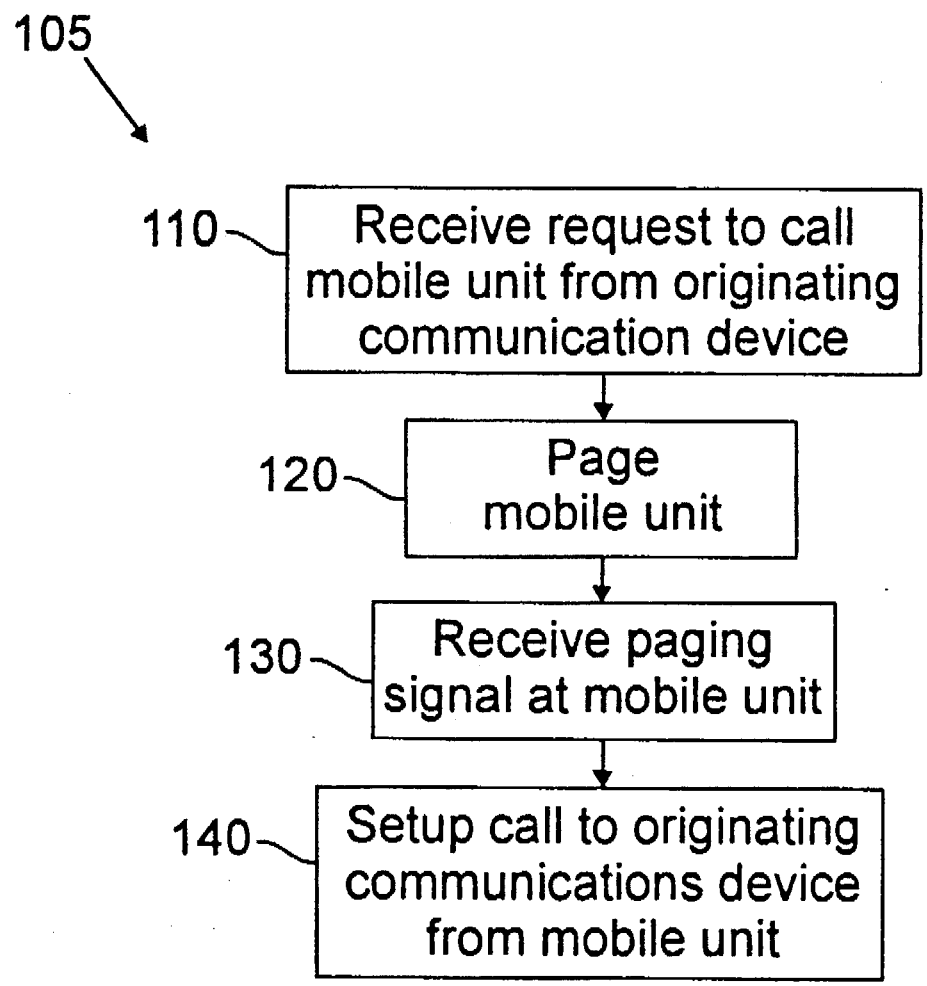
FIG. 2 is a flow chart of the global paging and reverse call setup method of the present invention.

FIG. 2 is a flowchart 105 of the operation of the apparatus of FIG. 1. The paging device 40 receives a request to call the mobile unit 100 from the originating communications device 20 at step 110 of FIG. 2. In response to the request, the paging device 40 produces a paging signal on the communication link 50, which is received and transmitted by the global communications network 60 at step 120. The paging signal is transmitted via transmitter/receivers 80, 82, 84, 86, and 88 and received and further transmitted via satellites 92, 94, 96 and 98. The mobile unit 100 receives the paging signal and in response transmits a reverse call setup signal, which sets up a call from the mobile unit 100 to the originating communications device 20, through the transmitter/receivers 80–88 and the satellites 92–98 and the global communications network 60, at steps 130 and 140. The call is preferably billed to the originating communications device 20.

Figure 3:
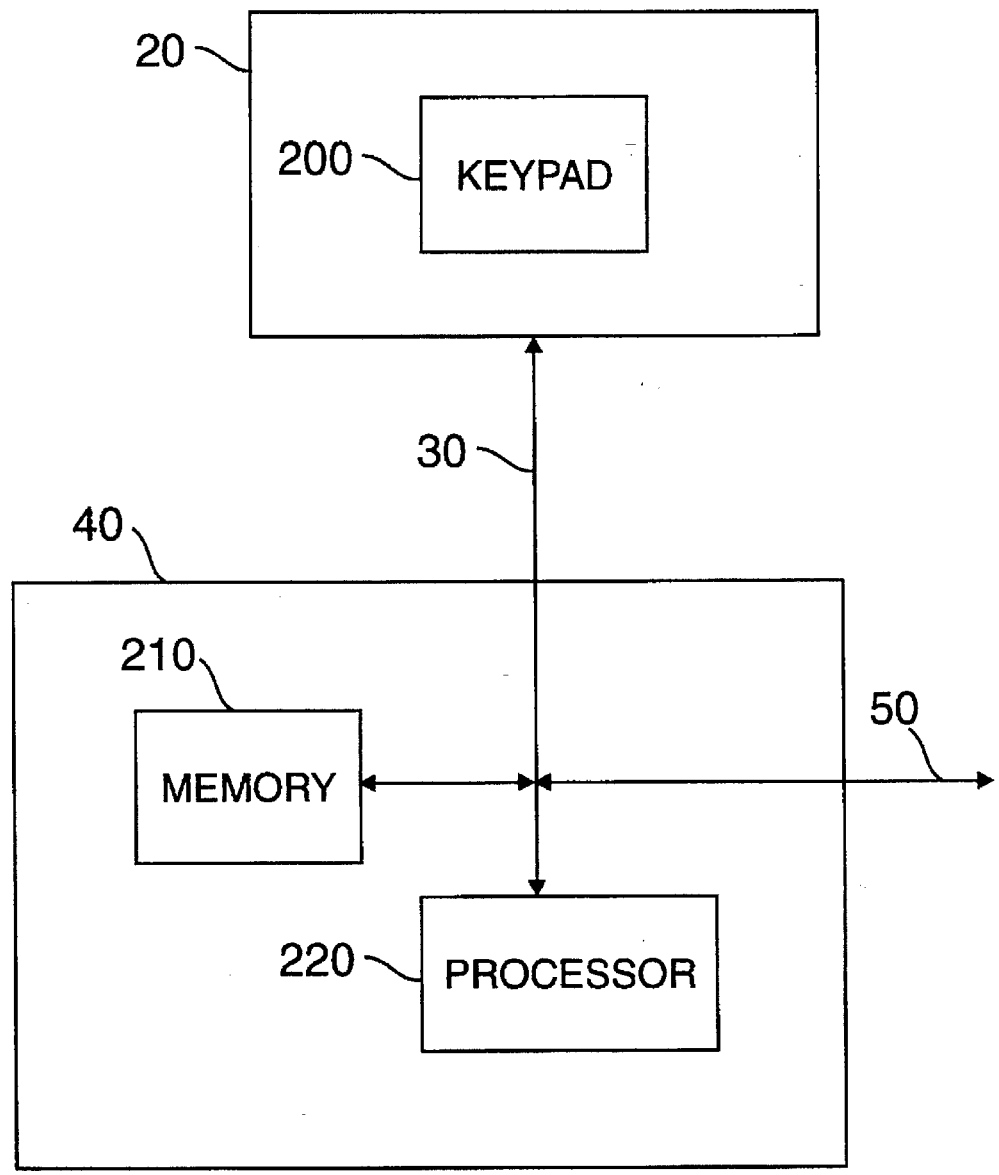
FIG. 3 is a schematic of an originating communications device and a paging device in accordance with the present invention.

FIG. 3 is a more detailed schematic of the originating communications device 20 and the paging device 40 in accordance with the present invention. The communications device 20 comprises a keypad 200. The paging device 40 comprises a processor 220 and a memory 210. The communications device 20 is connected via a communication link 30 to the processor 220. The processor 220 is connected to the memory 210 and the communication link 50 through the input/output bus 30. The communication link 50 is adapted to be connected to the global communications network 60 of FIG. 1, as is known in the art.

Figure 4:
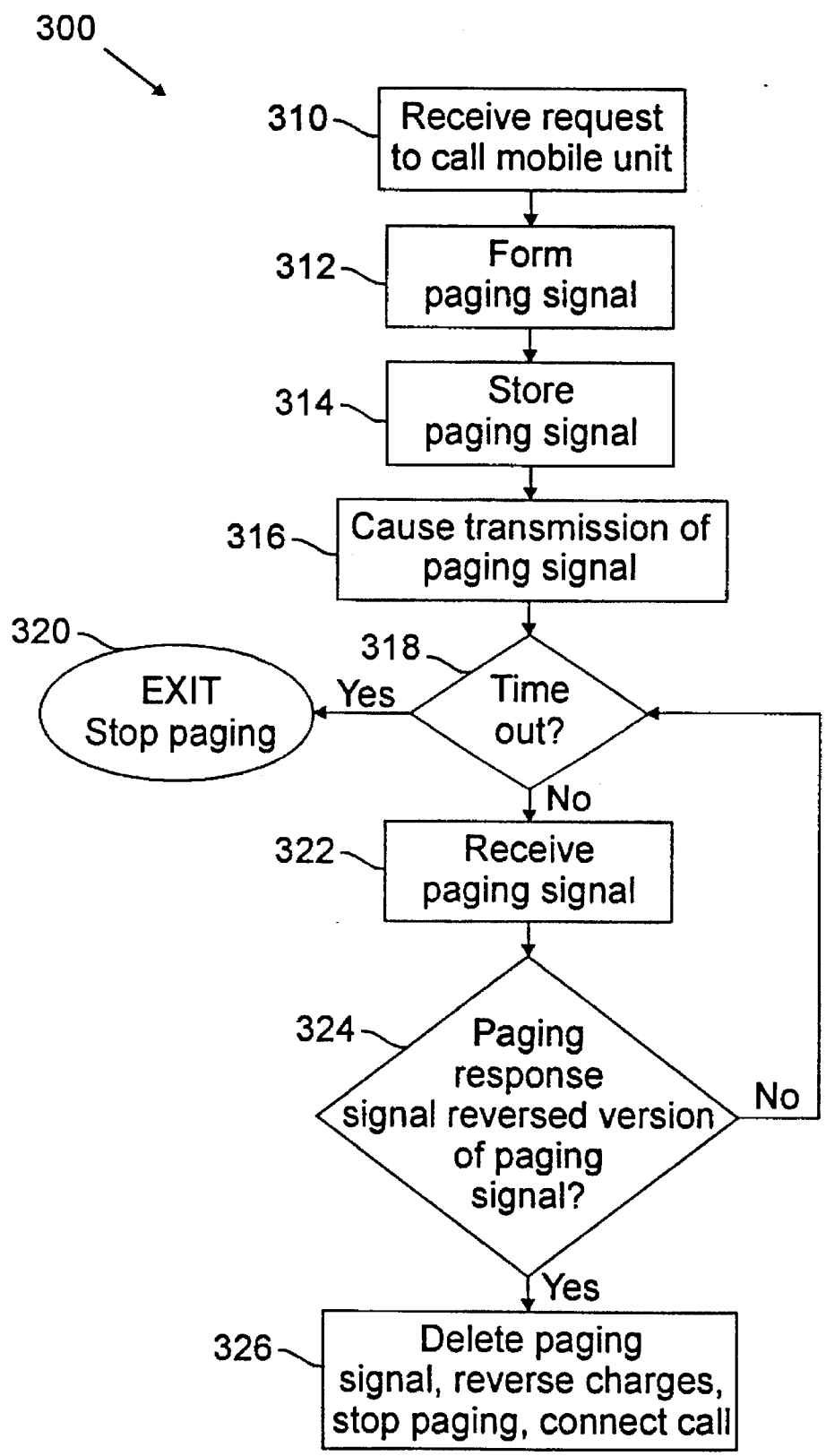
FIG. 4 is a flow chart of the operation of the originating communications device and the paging device of FIG. 3.

FIG. 4 is a flow chart 300 of the operation of the originating communications device 20 and the paging device 40 of FIG. 3. When an individual desires to use the communications device 20 to call the mobile unit 100 in FIG. 1, they first dial the identification code or an indicia of the identification code of the mobile unit 100 on the keypad 200 of the communications device 20. The communications device 20 sends the dialed code to the processor 220, which examines the code to determine if it identifies a mobile unit. If the dialed code identifies a mobile unit, the code is recognized by the processor 220 as a request to call a mobile unit, as indicated in step 310 of the flow chart 300 of FIG. 4. The processor 220 may be capable of receiving requests to call a mobile unit only from communications device 20 or may have the capability of receiving mobile unit call requests from a plurality of communications devices.

The processor 220 forms a paging signal comprised of a caller identification code for the communications device 20 and a callee identification code for the mobile unit 100, at step 312 of FIG. 4. The paging signal is then sent from the processor 220 through the communication link 50 to the global communications network 60 in FIG. 1. The processor 220 then preferably sends Out a control signal on the communication link 50 to cause continuous transmission of the paging signal by the global communications network 60 and the transmitter/receivers 80–88 and the satellites 92–98 in step 316 of FIG. 4. Alternatively, the processor 220 can continuously send the paging signal out on communication link 50.

The processor 220 also stores the paging signal in the memory 210. Alternatively, if the memory 210 is associated solely with the communications device 20, the processor 220 may only store the mobile unit callee identification code of the paging signal. Otherwise, if the memory 210 is used by a plurality of communications devices, an identification code for the particular originating communications device should be stored with the identification code of the mobile unit callee.

After transmitting the paging signal, the processor 220 periodically examines a timer to determine whether the paging signal has been transmitted for its allotted time period at step 318. If the allotted time period has ended, paging is stopped at step 320.

If a mobile unit, such as the mobile unit 100 of FIG. 3, transmits a paging response signal within the allotted time period, the processor 220 determines whether that paging response signal is a reverse call setup signal. First, the processor 220 receives the paging response signal through the communication link 50 at step 322 of FIG. 4. Then the processor 220 retrieves the paging signal from memory 210 and determines whether the callee and caller identification codes of the paging signal correspond to the caller and callee identification codes of the paging response signal, respectively, at step 324. If such a correspondence condition does not exist, the paging response signal is not a reverse call setup signal and the processor 220 loops back to step 318 of FIG. 4. The processor 220 again periodically checks for a time out and waits for the next paging response signal from a mobile unit.

If the previously described correspondence condition does exist, the processor 220 recognizes the paging response signal as a reverse call setup signal. In response to the reverse call setup signal, the processor 220 stops transmission of the paging signal, deletes the paging signal from memory 210, and preferably charges the call to the originating communications device 20. The processor 220 preferably also sends a second control signal to the global communications network 60 to stop transmission of the paging signal.

Figure 5:
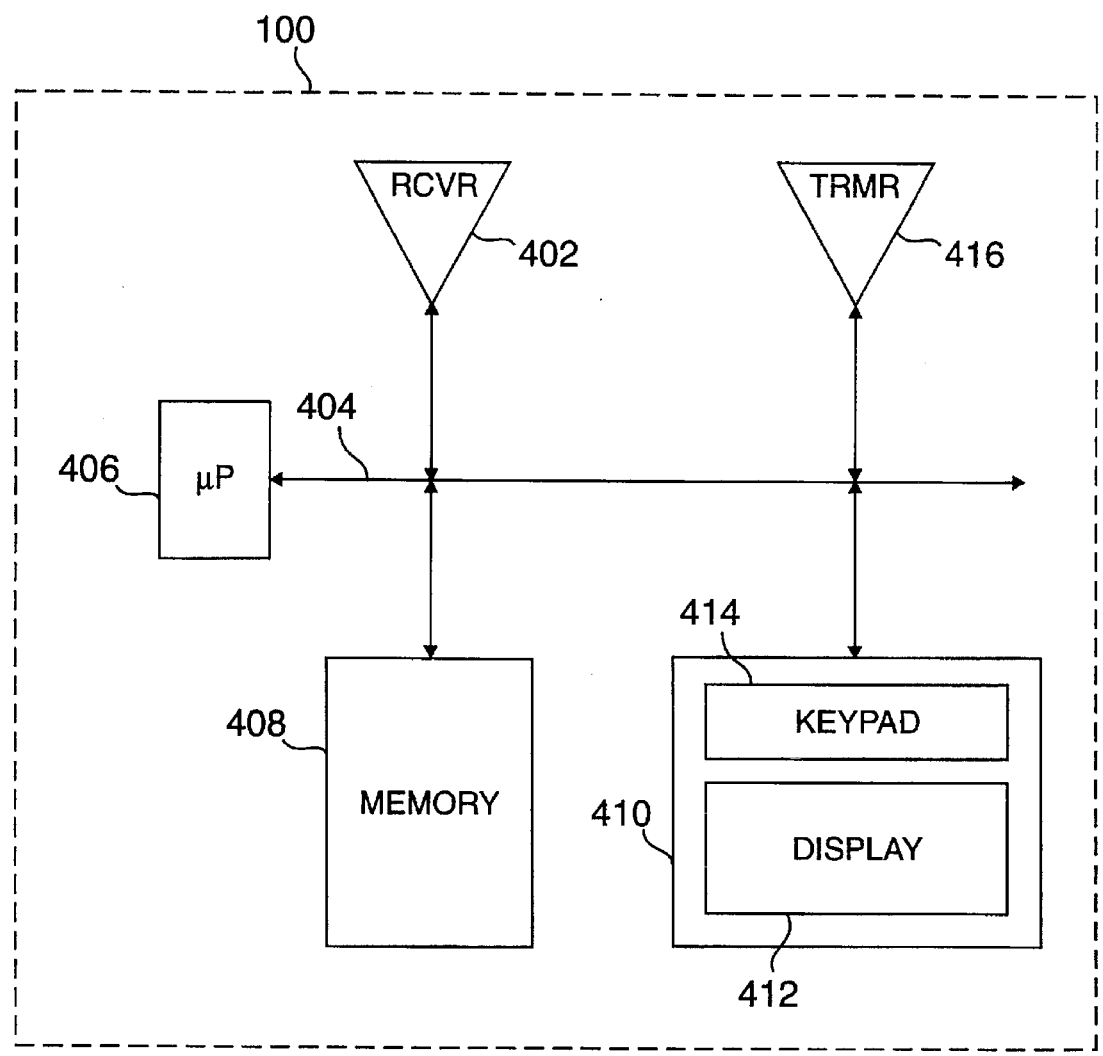
FIG. 5 is a schematic of a mobile unit in accordance with the present invention.

FIG. 5 is a more detailed schematic of the mobile unit 100 in accordance with the present invention. The mobile unit 100 receives the paging signal through a receiver 402, and transmits a reverse call setup signal through a transmitter 416. The receiver 402, a memory 408, an optionally provided terminal 410, and the transmitter 416 are connected to the processor 406 by an input/output bus 404. The terminal 410 further comprises the display 412 and the keypad 414.

Figure 6:
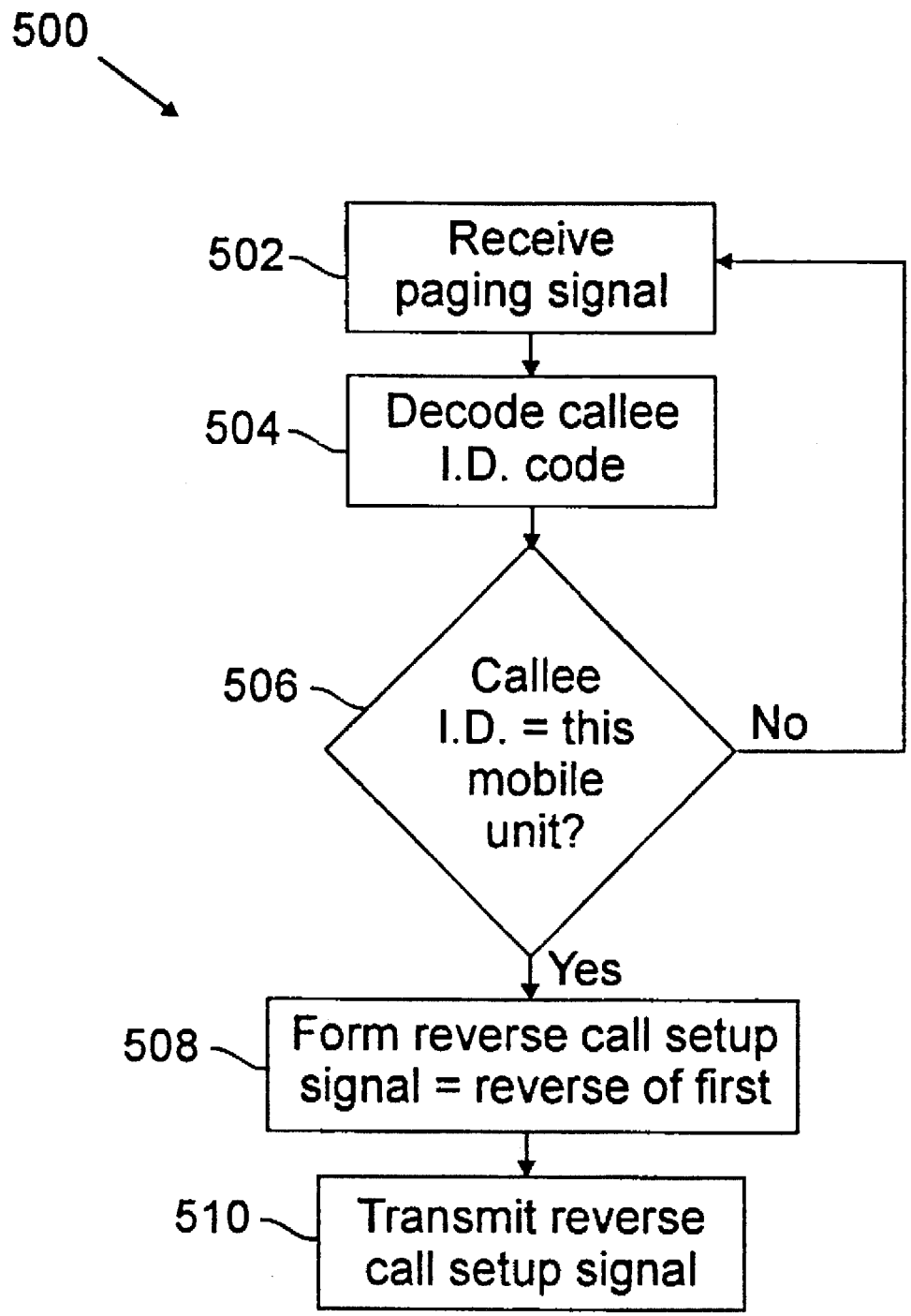
FIG. 6 is a flow chart of the operation of the mobile unit of FIG. 5.

The detailed operation of the mobile unit 100 is described by the flow chart 500 of FIG. 6. The paging signal, which includes a caller and a callee identification code, is received by the receiver 402 at step 502 of flow chart 500. The paging signal is sent to the processor 406, which decodes the paging signal, at step 504, to determine the callee identification code. The processor 406 then retrieves the identification code for the mobile unit 100 from the memory 408 and compares the callee identification code with the mobile unit identification code at step 506. If the callee identification code in the paging signal corresponds to the identification code for the mobile unit 100, the processor 406 reverses the order of the caller and callee identification codes to form a reverse call setup signal, at step 508, and sends out the reverse call setup signal, at step 510. The reverse call setup signal is sent to the transmitter 416, and then transmitted.

The mobile unit 100 can optionally be provided with a terminal 410 to allow an operator to enable a reverse call setup signal. The processor 406 sends the caller identification code to the terminal 410 via the input/output bus 404. The terminal 410 includes a display 412 which indicates to the operator the identification code of the originating caller communications device, such as the originating communications device 20 of FIG. 1. A keypad 414 is provided on the terminal 410 to allow the operator of the mobile unit 100 to dial the identification code or indicia representative of the identification code of the originating caller communications device to enable a reverse call setup operation. When the identification code or indicia is dialed, the terminal 410 sends out an enable signal to the processor 406 to cause the processor 406 to send out a reverse call setup signal to transmitter 416. The reverse call setup signal is comprised of a callee and a caller identification code which correspond to the caller and the callee identification code of the paging signal, respectively. Alternatively, the display 412 can simply request a "yes" or "no" response from the operator. The operator may then activate a single key on the keypad 414 to enable a reverse call setup signal.

The reverse call setup signal need not be a reversed version of the paging signal. In that case other information is preferably provided in the reverse call setup signal to indicate that it is responding to a particular paging signal.

The present invention reduces call setup delay between an originating communications device and a mobile unit. Furthermore, it preferably does not require the originating communications device to know the location of the mobile unit.

We claim:

1. A method of paging to initiate a call setup between an originating communications device and a mobile unit, comprising:

receiving a request to call the mobile unit from the originating communications device;

forming a paging signal comprised of a caller identification code and a callee identification code;

storing the paging signal in memory;

continuously transmitting the paging signal;

receiving a paging response signal from the mobile unit, the paging response signal being comprised of a caller identification code and a callee identification code;

comparing the paging signal with the paging response signal; and terminating the transmitting of the paging signal if a correspondence condition is satisfied such that the caller and the callee identification codes of the paging signal correspond to the callee and the caller identification codes of the paging response signal, respectively.

2. The method of claim 1 further comprising deleting the paging signal from said memory if the correspondence condition is satisfied.

3. The method of claim 2 further comprising billing the originating communications device if the correspondence condition is satisfied.

4. The method of claim 1 further comprising billing the originating communications device if the correspondence condition is satisfied.

5. A method of setting up a call between a communications device and a mobile unit, comprising:

transmitting a paging signal comprised of a callee identification code and a caller identification code;

receiving the paging signal at a mobile unit having an identification code;

determining if the callee identification code corresponds to the identification code of the mobile unit;

if the callee identification code corresponds to the identification code of the mobile unit, forming a reverse call setup signal comprised of a caller identification code and a callee identification code, wherein the caller and callee identification code of the reverse call setup signal correspond to the callee and caller identification code of the paging signal, respectively; and transmitting the reverse call setup signal automatically if the callee identification code of the paging signal corresponds to the identification code of the mobile unit.

6. A method for setting up calls between mobile units and other communications devices, comprising the steps of:

transmitting a request to call a mobile unit from an originating communications device;

forming a paging signal in response to the request to call comprised of a caller identification code and a callee identification code;

continuously transmitting the paging signal;

receiving the paging signal at the mobile unit;

determining if the callee identification code of the paging signal corresponds to an identification code for the particular mobile unit; transmitting a reverse call setup signal comprised of a caller identification code and a callee identification code from the mobile unit to the originating communications device if the callee code corresponds to the identification code for the mobile unit, said transmission occurring automatically in response to the mobile unit determining that the callee identification code corresponds to the identification code for the mobile unit.

7. An apparatus for providing communications between a mobile unit and a communications device, comprising:

a memory; a transmitter; a receiver; and a processor having an input and an output and being operatively connected to the transmitter and receiver, the processor:

receiving at its input a request to call a mobile unit from an originating communications device and forming a paging signal comprised of a caller identification code and a callee identification code, storing the paging signal in said memory and sending the paging signal to the transmitter;

sending a first control signal to the transmitter to cause the transmitter to continuously transmit the paging signal;

receiving at its input a paging response signal from the mobile unit through the receiver, the paging response signal comprised of a caller identification code and a callee identification code;

retrieving the paging signal from said memory and comparing the paging signal with the paging response signal; and sending a second control signal to the transmitter to cause transmission of the paging signal to cease if a correspondence condition is satisfied such that the caller and the callee identification codes of the paging signal correspond to the callee and the caller identification codes of the paging response signal, respectively.

8. The apparatus of claim 7 wherein if the correspondence condition is satisfied, the processor deletes the paging signal from the memory.

9. The apparatus of claim 8 wherein if the correspondence condition is satisfied, the call is billed to the originating communications device.

10. The apparatus of claim 7 wherein if the correspondence condition is satisfied, the call is billed to the originating communications device.

11. A mobile unit for communicating with other communications devices comprising:

a receiver; a memory;

a processor which:

receives a paging signal comprised of a caller identification code and a callee identification code from the receiver;

retrieves from said memory an identification code of the mobile unit;

determines if the callee identification code corresponds to the identification code of the mobile unit; and forms a reverse call setup signal comprised of a caller identification code and a callee identification code, wherein the caller identification code and the callee identification code of the reverse call setup signal correspond to the callee identification code and the caller identification code of the paging signal, respectively; and a transmitter for transmitting the reverse call setup signal, wherein the processor sends the reverse call setup signal automatically to the transmitter upon determining that the callee identification code of the paging signal corresponds to the mobile unit identification code.

12. An apparatus for providing communications between a mobile unit and a communication device, comprising:

a memory for storing a paging signal;

a transmitter for transmitting a paging signal;

a receiver for receiving a paging response signal; and a processor having an input and an output and being operatively connected to the transmitter and the receiver, the processor:

receiving at its input a request to call a mobile unit from an originating communications device and forming at its output a paging signal comprised of the caller identification code and the callee identification code;

storing the paging signal in the memory and sending the paging signal to the transmitter;

sending a first control signal to the transmitter to cause the transmitter to continuously transmit the paging signal;

receiving at its input a paging response signal from the mobile unit through the receiver, the paging response signal comprised of a caller identification code and a callee identification code;

comparing the paging signal with the paging response signal; and sending a second control signal to the transmitter to cause transmission of the paging signal to cease if a correspondence condition is satisfied such that the caller and the callee identification codes of the paging signal stored in memory correspond to the callee and the caller identification codes of the paging response signal, respectively.

13. The apparatus of claim 12 wherein if the correspondence condition is satisfied, the processor deletes the paging signal from the memory.

14. The apparatus of claim 13 wherein if the correspondence condition is satisfied, the call is billed to the originating communications device.

15. The apparatus of claim 12 wherein if the correspondence condition is satisfied, the call is billed to the originating communications device.

16. A mobile unit for communicating with other communications devices comprising:

a receiver for receiving a paging signal comprised of a callee identification code and a caller identification code;

a memory for storing an identification code of the mobile unit;

a processor for determining if the callee identification code corresponds to the identification code of the mobile unit, and for forming a reverse call setup signal comprised of a caller identification code and a callee identification code, wherein the caller identification code and the callee identification code of the reverse call setup signal correspond to the callee identification code and the caller identification code of the paging signal respectively; and a transmitter for transmitting said reverse call setup signal, wherein the processor sends the reverse call setup signal automatically to the transmitter upon determining that the callee identification code of the paging signal corresponds to the mobile unit identification code.

17. A method of setting up a call between an originating communications device and a mobile unit comprising the steps of:

transmitting a paging signal to the mobile unit, the paging signal comprised of a caller identification code and a callee identification code;

receiving a paging response signal from the mobile unit, the paging response signal being comprised of a caller identification code and a callee identification code;

comparing the paging signal with the paging response signal to determine if the caller and the callee identification codes of the paging signal correspond to the callee and the caller identification codes of the paging response signal, respectively; and connecting the call if the correspondence condition is satisfied.

18. An apparatus for setting up a call between an originating communications device and a mobile unit comprising:

a memory, a transmitter; a receiver; and a processor having an input and an output and being operatively connected to the transmitter and the receiver, the processor:

receiving at its input a request to call a mobile unit and forming at its output a paging signal comprised of a caller identification code and a callee identification code;

storing the paging signal in said memory and sending the paging signal to the transmitter;

sending a control signal to the transmitter to cause the transmitter to transmit the paging signal to the mobile unit;

receiving at its input a paging response signal from the mobile unit through the receiver, the paging response signal comprised of a caller identification code and a callee identification code;

retrieving the paging signal from said memory and comparing the paging signal with the paging response signal; and connecting the call if a correspondence condition is satisfied such that the caller and the callee identification codes of the paging signal stored in memory correspond to the callee and the caller identification codes of the paging response signal, respectively.

* * * * *